United States Patent
Lichtenegger (10) Patent No.: US 7,890,688 B2
(45) Date of Patent: Feb. 15, 2011

(54) METHOD AND APPARATUS FOR PROVIDING A HIGH-SPEED COMMUNICATIONS LINK BETWEEN A PORTABLE DEVICE AND A DOCKING STATION

(75) Inventor: Thomas Lichtenegger, Alteglofsheim (DE)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 122 days.

(21) Appl. No.: 12/329,982

(22) Filed: Dec. 8, 2008

(65) Prior Publication Data

US 2010/0146181 A1 Jun. 10, 2010

(51) Int. Cl.
*G06F 13/00* (2006.01)
(52) U.S. Cl. ........................ 710/303; 710/305
(58) Field of Classification Search ......... 710/300–317, 710/104–110, 8–12
See application file for complete search history.

(56) References Cited

U.S. PATENT DOCUMENTS

| | | | |
|---|---|---|---|
| 5,877,882 A | 3/1999 | Green et al. | |
| 6,023,587 A | 2/2000 | Watts, Jr. et al. | |
| 6,070,214 A | 5/2000 | Ahern | |
| 6,567,876 B1 * | 5/2003 | Stufflebeam | 710/303 |
| 7,395,363 B2 * | 7/2008 | Sterin | 710/305 |
| 7,676,624 B2 * | 3/2010 | Chu | 710/313 |
| 2006/0147214 A1 | 7/2006 | Ruiz et al. | |

OTHER PUBLICATIONS

Targus ExpressCard Notebook Docketing Station Targus ACP60US; Computer Geeks.com; 4 pages; Dec. 11, 2008; http://www.geeks.com/details.asp?invtid=ACP60USDT&cat=NBB.

* cited by examiner

*Primary Examiner*—Raymond N Phan (57) ABSTRACT

A docking station is provided with a SerDes component, one or more peripheral device I/O ports, and at least one high-speed serial I/O port for interfacing the docking station with a high-speed serial communications link. A portable device that can be docked on the docking station is also provided with a high-speed serial I/O port. A high-speed serial communications link is provided between the high-speed serial I/O port of the docking station and the high-speed serial I/O port of the portable device to enable serial data to be communicated between the portable device and the docking station. Providing the serial communications link obviates the need for a large connector with a high pin count for interfacing the portable device with the docking station. In addition, the inclusion of the SerDes component in the docking station eliminates the need for a southbridge IC on the motherboard of the portable device, or at least enables a southbridge IC having less complexity to be used on the motherboard of the portable device.

21 Claims, 9 Drawing Sheets

METHOD AND APPARATUS FOR PROVIDING A HIGH-SPEED COMMUNICATIONS LINK BETWEEN A PORTABLE DEVICE AND A DOCKING STATION

TECHNICAL FIELD OF THE INVENTION

The invention relates to portable devices and docking stations, and more particularly, to providing a high-speed serial connection in a portable device, such as a notebook computer, that enables the portable device to communicate with a docking station and that eliminates the need to provide portable devices with parallel connections for communicating with docking stations.

BACKGROUND OF THE INVENTION

Figure 1:
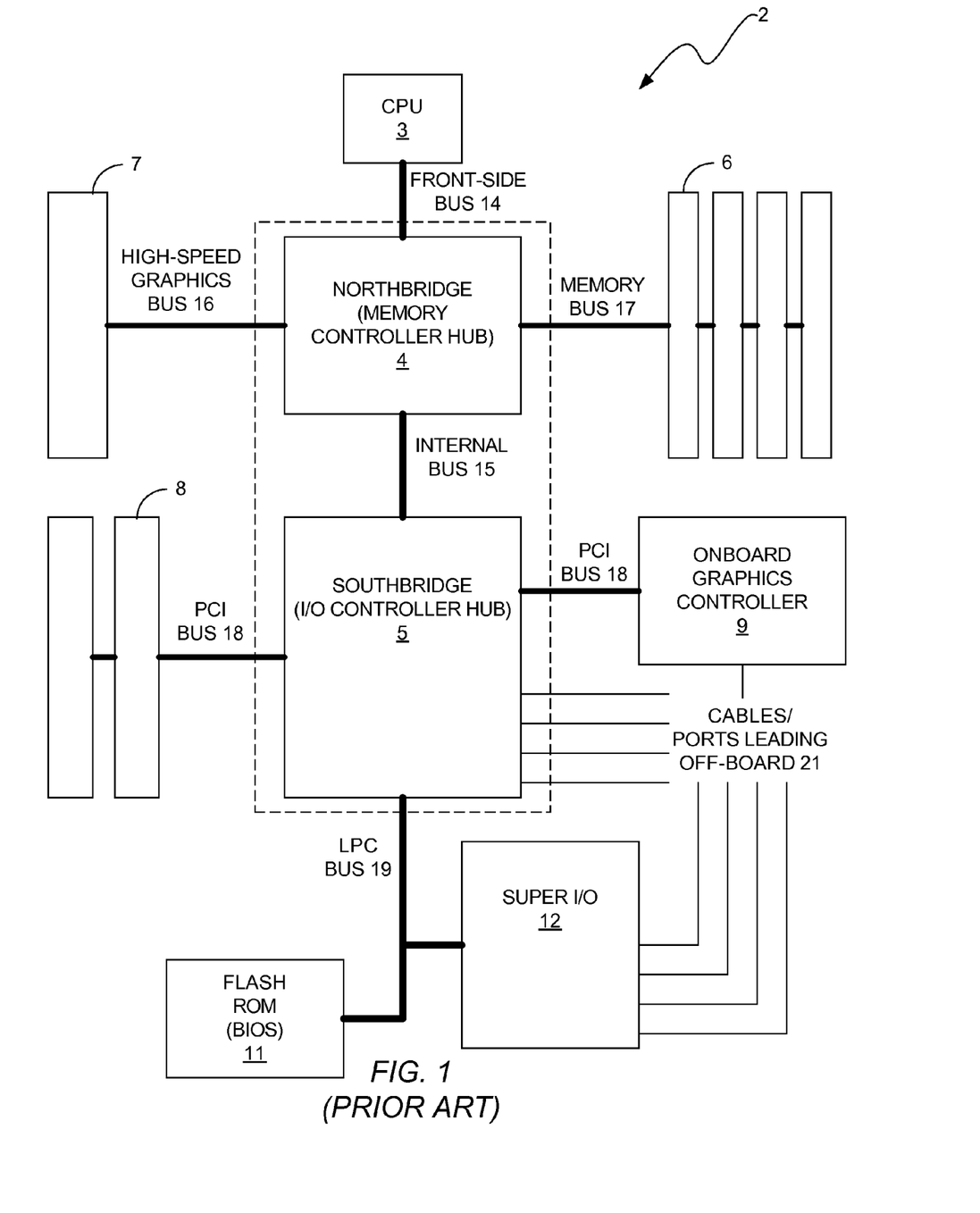
FIG. 1 illustrates a block diagram of the electrical components of a typical PCB motherboard of a typical notebook computer.

FIG. 1 illustrates a block diagram of the electrical components of a typical printed circuit board (PCB) motherboard 2 of a typical notebook computer. The motherboard 2 typically has several integrated circuits (ICs) mounted on it, such as, for example, a central processing unit (CPU) IC 3, a northbridge IC 4, a southbridge IC 5, an on-board graphics controller IC 9, a flash read-only-memory (ROM) IC 11, and a super input/output (I/O) IC 12. The motherboard 2 typically also includes several other components, such as memory slots 6, a graphics card slot 7, Peripheral Component Interconnect (PCI) slots 8, and busses 14-19. The CPU 3 is connected to the northbridge IC 4 by a front-side bus 14. The northbridge IC 4 is connected to the southbridge IC 5 by an internal bus 15. The northbridge IC 4 is connected to the graphics card slot 7 by a high-speed graphics bus 16. The northbridge IC 4 is connected to the memory slots 6 by a memory bus 17. The southbridge IC 5 is connected to the graphics controller IC 9 and to the PCI slots 8 by a PCI bus 18. The southbridge IC 5 is connected to the flash ROM device 11 and to the super I/O device 12 by a low pin count (LPC) bus 19.

The southbridge IC 5, the graphics controller IC 9 and the super I/O IC 12 have a plurality of I/O ports to which a plurality of electrical cables 21 may be connected in order to interface the motherboard 2 with external devices. For example, the southbridge IC 5 typically includes ports such as a Universal Serial Bus (USB) port, an Ethernet port, an audio coder/decoder (codec) port, a complementary metal oxide semiconductor (CMOS) memory device port, and other I/O ports. The super I/O IC 12 typically includes several I/O ports such as, for example, a serial port, a parallel port, a floppy disk port, a keyboard port, and a mouse port.

Docking stations and port replicators are apparatuses that are often used with notebook computers to enable the notebook computers to interface with external peripheral devices, such as, for example, display monitors, keyboards, mice, external disk drives, backup storage drives, printers, etc. When a docking station (not shown) or port replicator (not shown) is used with a notebook computer, the docking station or port replicator includes a connector that connects to a mating receptacle on the notebook computer. This connection interfaces the I/O ports of the southbridge IC 5, the graphics controller IC 9 and the super I/O IC 12 with electrical circuitry of the docking station or port replicator. Electrical cables are then used to connect the peripheral devices to the docking station or port replicator, thereby placing the peripheral devices in communication with the corresponding components of the motherboard 2.

The southbridge IC 5 includes a serializer/deserializer (SerDes) component (not shown). This component converts data that is in serial format into data that is in parallel format and converts data that is in parallel format into data that is in serial format. Because of the relatively large number of parallel I/O ports that are in the southbridge IC 5 and in the super I/O IC 12, the connector of the docking station or port replicator typically has a very high pin count (e.g., 150 to 200 pins). There are several disadvantages to such connectors. For example, connectors that have a large number of pins have large form factors, which means that the receptacle on the notebook computer and the corresponding contact area on the motherboard 2 are also relatively large in size. In addition, the large form factor of the connector and the accuracy with which the pins need to be aligned generally increase costs and reduce manufacturing yield. Furthermore, different parallel I/O connections on the motherboard 2 often have different data rate capabilities. However, all of these connections need to be designed to operate at the highest of these data rates. This results in over-engineering of the connections that would otherwise utilize lower data rates, which also leads to increased costs.

Accordingly, a need exists for a method and apparatus that enable the motherboard of the notebook computer to interface to a docking station or port replicator in a way that obviates the need for a connector that has a high pin count and a large form factor while also providing a high-speed communication link.

SUMMARY OF THE INVENTION

The invention provides methods and apparatuses for use in docking stations and portable devices that eliminate the need for large form factor connectors with high pin counts for interfacing portable devices with docking stations. In accordance with an embodiment, a docking station is provided comprising a circuit board (CB), a housing and at least one serializer/deserializer (SerDes) component. The CB has electrical circuitry thereon for communicating with one or more peripheral devices via one or more peripheral device I/O ports of the docking station and for communicating via at least one high-speed serial I/O port of the docking station with a portable device. The high-speed serial I/O port provides a serial connection for interfacing the docking station with a high-speed serial communications link that also interfaces with a high-speed serial I/O port of a portable device. The CB is secured within the housing. The SerDes component is connected to the electrical circuitry of the CB. Serial bit streams received over the high-speed serial communications link via the high-speed serial I/O port of the docking station from a portable device are input to the SerDes component. The SerDes component is configured to convert a serial bit stream input thereto into parallel bits. The electrical circuitry of the CB is configured to receive the parallel bits output from the SerDes component and to send one or more of the received bits to one or more of the peripheral device I/O ports of the docking station.

In accordance with another embodiment, a portable device is provided that comprises a CB having a substrate and a plurality of electrical conductors formed on or in the substrate, one or more ICs mounted on the CB, a CPU IC mounted on the CB and at least one high-speed serial I/O port configured to interface the portable device with a high-speed serial communications link that interfaces with a docking station. The ICs have one or more electrical contact pads that are electrically coupled to one or more of the electrical conductors of the CB. The CPU IC has one or more electrical contact pads that are electrically coupled to one or more of the electrical conductors of the CB. If the portable device is docked on a docking station, bits produced in the portable device that are destined for one or more peripheral devices connected to one or more peripheral device I/O ports of the docking station are sent as a serial bit stream over the high-speed serial communications link from the high-speed serial I/O port of the portable device to the high-speed serial I/O port of the docking station.

In accordance with another embodiment, an apparatus is provided that comprises a docking station, a portable device and a high-speed serial communications link interfacing the portable device with the docking station. The docking station comprises a CB, a housing and at least one SerDes component. The CB has electrical circuitry thereon for communicating with one or more peripheral devices via one or more peripheral device I/O ports of the docking station and for communicating via at least one high-speed serial I/O port of the docking station with a portable device. The high-speed serial I/O port provides a serial connection for interfacing the docking station with a high-speed serial communications link that also interfaces with a high-speed serial I/O port of a portable device. The CB is secured within the housing. The SerDes component is connected to the electrical circuitry of the CB. The portable device comprises a CB having a substrate and a plurality of electrical conductors formed on or in the substrate, one or more ICs mounted on the CB of the portable device, a CPU IC mounted on the CB of the portable device and at least one high-speed serial I/O port configured to interface the portable device with a high-speed serial communications link that interfaces with the docking station. The ICs of the portable devices have one or more electrical contact pads that are electrically coupled to one or more of the electrical conductors of the CB. The CPU IC has one or more electrical contact pads that are electrically coupled to one or more of the electrical conductors of the CB. Bits produced in the portable device that are destined for one or more peripheral devices connected to one or more peripheral device I/O ports of the docking station are sent as a serial bit stream over the high-speed serial communications link from the high-speed serial I/O port of the portable device to the high-speed serial I/O port of the docking station. In the docking station, the serial bit stream is received and converted into parallel bits, which are then received in the electrical circuitry of the docking station. The electrical circuitry of the docking station CB sends one or more of the bits received from the SerDes component to one or more of the peripheral devices connected to one or more of the peripheral device I/O ports of the docking station.

In accordance with another embodiment, the invention comprises a method for communicating bits over a high-speed serial communications link between a portable device and a docking station. The method comprises providing a docking station having at least a SerDes component, one or more peripheral device I/O ports, and at least one high-speed serial I/O port. The method further comprises providing a portable device having at least a CPU IC, one or more other ICs and at least one high-speed serial I/O port. The method further comprises providing a high-speed serial communications link between the high-speed serial I/O port of the portable device and the high-speed serial I/O port of the docking station. The method further comprises converting, in the portable device, parallel bits destined for one or more peripheral devices connected to one or more of the peripheral device I/O ports of the docking station into a serial bit stream and outputting the serial bit stream via the high-speed serial I/O port of the portable device onto the high-speed serial communications link. The method further comprises inputting the serial bit stream communicated over the communications link to the docking station via the high-speed serial I/O port of the docking station, providing the serial bit stream to the SerDes component of the docking station, and, in the SerDes component of the docking station, deserializing the serial bit stream. The method further comprises receiving the deserialized bits in electrical circuitry of the docking station and causing one or more of the deserialized bits to be sent to one or more of the peripheral devices connected to one or more of the peripheral device I/O ports of the docking station.

These and other features and advantages of the invention will become apparent from the following description, drawings and claims.

DETAILED DESCRIPTION OF AN ILLUSTRATIVE EMBODIMENT

In accordance with the invention, a docking station is provided with a SerDes component, or with a southbridge IC that includes a SerDes component, with one or more peripheral device I/O ports and with a high-speed serial I/O port for interfacing the docking station with a high-speed serial communications link. A portable device that can be docked on the docking station is also provided with a high-speed serial I/O port for interfacing the portable device with a high-speed serial communications link. A high-speed serial communications link is provided between the high-speed serial I/O port of the docking station and the high-speed serial I/O port of the portable device to enable serial data to be communicated at a high data rate between the portable device and the docking station. Providing this serial communications link obviates the need for a large connector having a high pin count of the type commonly used for interfacing a portable device with a docking station or port replicator. In addition, the inclusion of the SerDes component, or the southbridge IC itself, in the docking station eliminates the need for a southbridge IC on motherboard of the portable device, or at least enables a southbridge IC having less complexity to be used on the motherboard of the portable device. The serial communications link may be established via a wired electrical connection, an optical link, or a wireless electrical link, as will be described below in more detail with reference to FIGS. 2-9.

Figure 2:
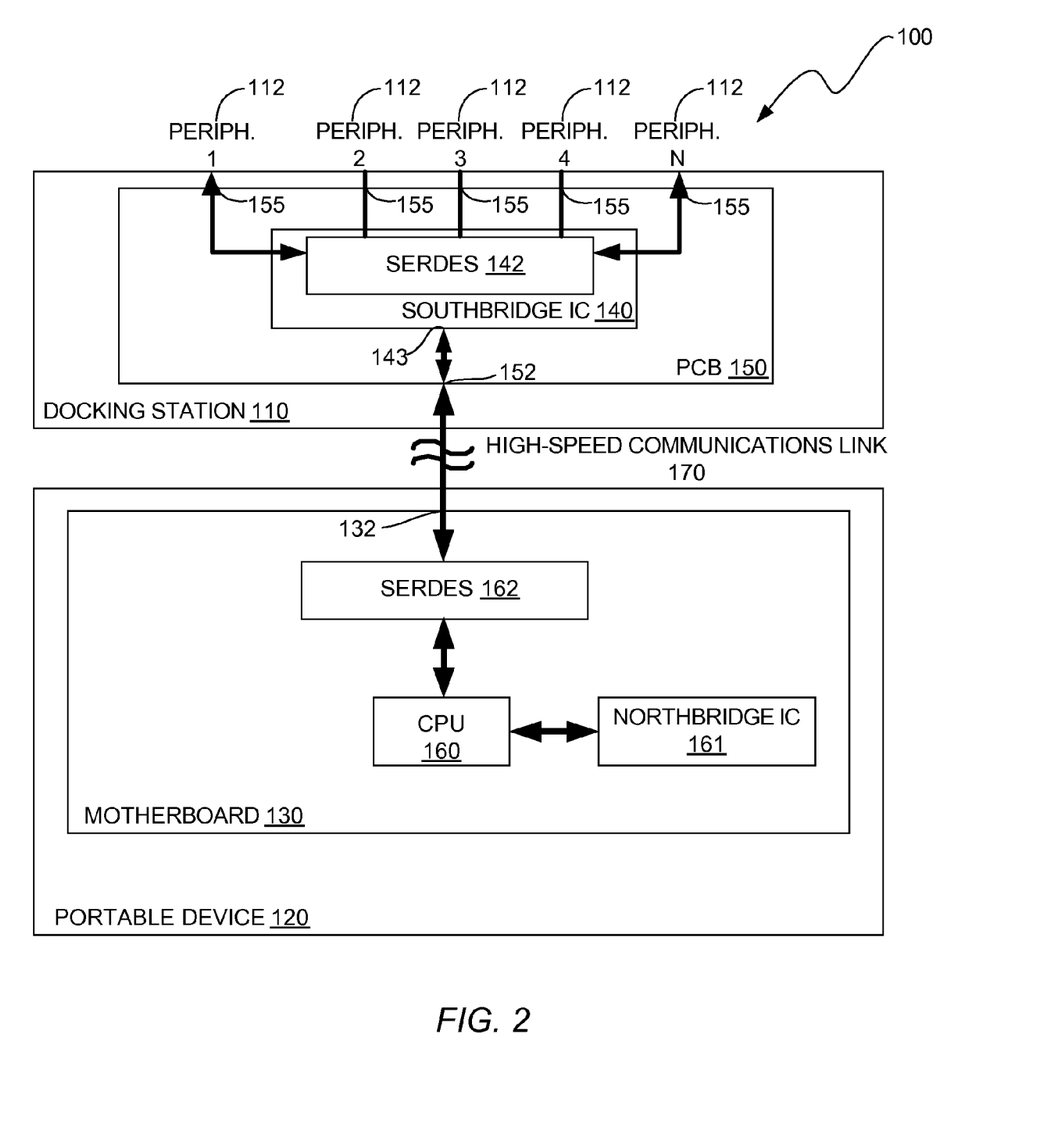
FIG. 2 illustrates a block diagram of the apparatus of the invention in accordance with a first illustrative or exemplary embodiment.

FIG. 2 illustrates a block diagram of the apparatus 100 of the invention in accordance with a first illustrative or exemplary embodiment. In accordance with this embodiment, the apparatus 100 includes a docking station 110 and a portable device 120 having a motherboard 130 that has been modified from the typical known configuration of the motherboard 2 shown in FIG. 1. In particular, unlike the motherboard 2 shown in FIG. 1, the motherboard 130 shown in FIG. 2 does not include a southbridge IC. Rather, the docking station 110 includes a southbridge IC 140, which includes a SerDes component 142. The southbridge IC 140 of the docking station 110 is mounted on a PCB 150 of the docking station 110. The PCB 150 has I/O ports 155 for interfacing the docking station 110 with one or more peripheral devices 112, which are labeled PERIPH. 1-PERIPH. N in FIG. 2. One or more of the ports 155 are typically parallel ports while one or more of the ports 155 are typically serial ports. It should be noted that all of the ports 155 may be serial ports or parallel ports, although the ports 155 will typically include some combination of serial ports and parallel ports.

The motherboard 130 of the portable device 120 includes a CPU 160 and typically includes one or more of the components shown on the motherboard 2 in FIG. 1, such as a northbridge IC 161, for example. For ease of illustration and discussion, except for the northbridge IC 161, these other components are not shown in FIG. 2. Unlike the configuration of the motherboard 2 shown in FIG. 1, the northbridge IC 161 is not in the path between the CPU 160 and the southbridge IC 140, which has been moved to the PCB 150 of the docking station 110. Also, although the northbridge IC 161 is shown as being mounted on the motherboard 130 of the portable device 120, the northbridge IC 161 may instead be removed from the portable device 120 and mounted on the PCB 150 of the docking station 110.

The CPU 160 outputs parallel bit streams of data. A SerDes component 162 located on the motherboard 130 of the portable device 120 receives the parallel bit stream and converts it into a serial bit stream. The serial bit stream is then output from a serial port 132 of the motherboard 130 and communicated serially over the high-speed serial communications link 170 to the docking station 110. It should be noted that the SerDes component 162 may be eliminated if the CPU 160 is configured to perform a SerDes algorithm. In the latter case, the CPU 160 serializes bits inside of the CPU 160 and outputs a serial bit stream directly to serial port 132, which then outputs the serial bit stream onto the high-speed serial communications link 170 for transmission to the docking station 110.

At the docking station 110, the serial bit stream is input to a serial port 152 of the PCB 150, which is connected to a serial I/O port 143 of the southbridge IC 140. In the southbridge IC 140, logic (not shown) identifies one of the peripheral devices 112 as the intended target for the received bits. If the peripheral device 112 to which the bit stream is targeted serially interfaces with the docking station 110, then it is possible that no conversion needs to be performed by the SerDes component 142 of the docking station 110. In this case, the serial bit stream may be sent to the corresponding peripheral device 112 via the corresponding I/O port 155 of the PCB 150. It should be noted that the southbridge IC 140 may perform some other processing or conditioning of the serial bit stream before it is sent to the corresponding peripheral device 112.

If the peripheral device 112 identified as the target device by the southbridge IC 140 is connected to an I/O port 155 that provides a parallel interface, then the serial bit stream received at I/O port 152 is converted by the SerDes component 142 into a corresponding parallel bit stream before being sent to the corresponding peripheral device 112. The parallel bit stream is then sent to the corresponding peripheral device via the corresponding parallel I/O port 155 of the PCB 150. If the serial bits that are transmitted over the high-speed communications link 170 are intended for two or more peripheral devices 112 that interface with respective serial I/O ports 155 of the docking station 110, then the SerDes component 142 typically performs a multiplexing operation that deserializes and multiplexes the bits so that they are sent to the appropriate I/O ports 155.

The SerDes component 140 typically contains multiple SerDes devices (not shown) for performing multiple different types of serial-to-parallel and parallel-to-serial conversions. For example, two of the I/O ports 155 may both be parallel ports, but may yet be different in that they support different numbers of bits and thus use connectors having different pin counts. Therefore, the serial-to-parallel conversion processes performed for data bits destined for these two ports will be different. For example, assuming that the two the I/O ports 155 that are connected to the peripheral devices labeled PERIPH. 1 and PERIPH. N are sixteen and thirty-two bit ports, respectively, one SerDes device (not shown) of the SerDes component 140 will perform a serial-to-parallel conversion process that converts sixteen serial bits into sixteen parallel bits and the other will perform a serial-to-parallel conversion process that converts thirty-two serial bits into thirty-two parallel bits. Because SerDes devices are well known in the art, a description of the manner in which SerDes devices perform serial-to-parallel and parallel-to-serial conversion will not be provided herein in the interest of brevity.

Providing the docking station 110 with the southbridge IC 140 enables the communications link 170 between the portable device 120 and the docking station to be a serial link. Because a serial link as opposed to the parallel link is used for this purpose, a connector (not shown) having a low pin count may be used to connect the docking station 110 with the portable device 120. Such a connector may have, for example, as few as one to four pins, which enables the connector may have a small form factor and to be manufactured at relatively low cost with relatively high manufacturing yield. Consequently, the receptacle (not shown) for receiving the connector on the portable device 120 and the corresponding contact area on the motherboard 130 can be made smaller, which results in corresponding reduced footprints on the housing (not shown) and on the motherboard 130 of the portable device. The reduced footprint on the motherboard 130 facilitates the goals of achieving high component density and providing increased functionality on the motherboard 130 without having to increase the overall size of the motherboard 130 or of the portable device 120.

Figure 3:
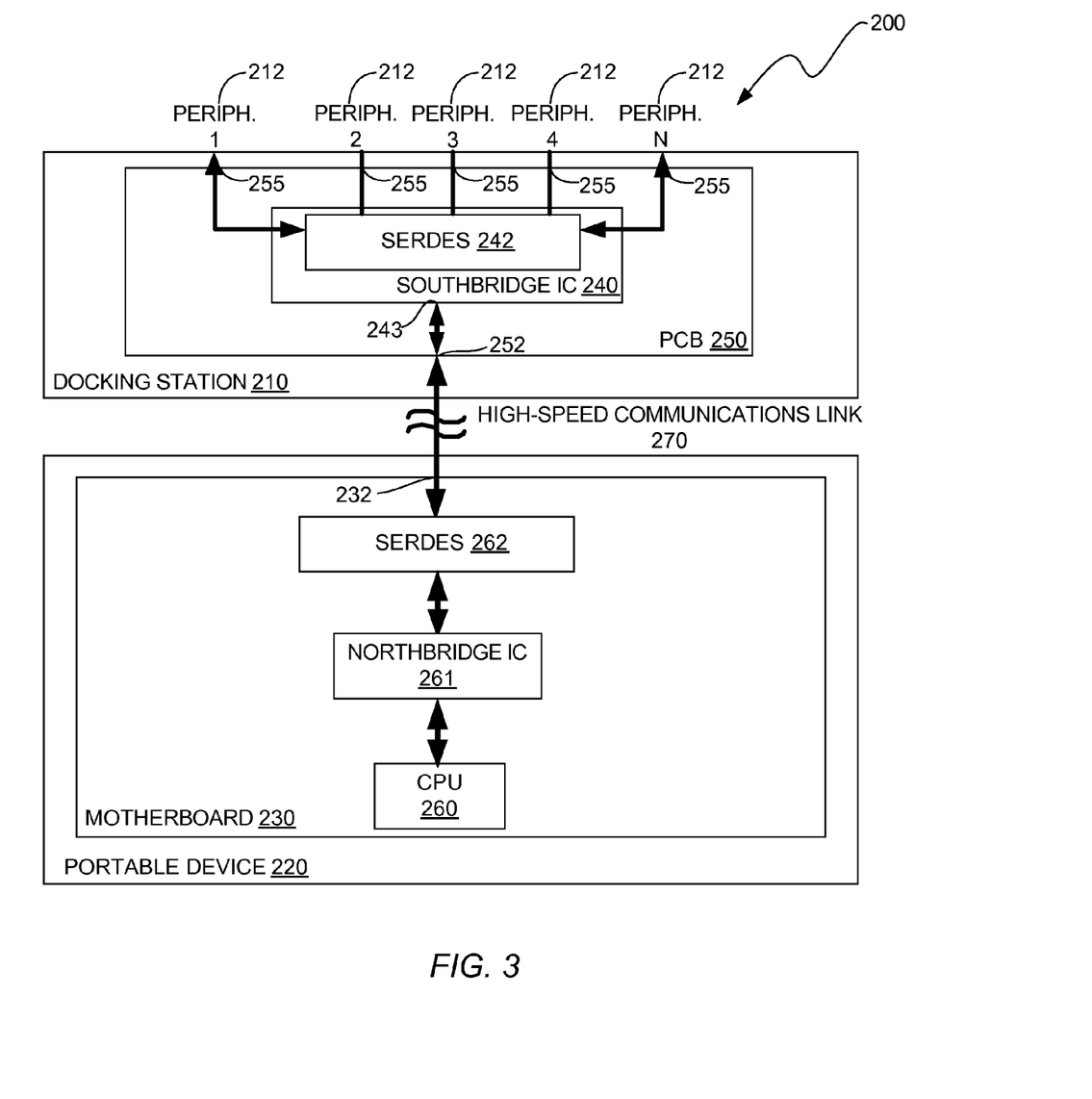
FIG. 3 illustrates a block diagram of the apparatus of the invention in accordance with another illustrative or exemplary embodiment.

FIG. 3 illustrates a block diagram of the apparatus 200 of the invention in accordance with another illustrative or exemplary embodiment. In accordance with this embodiment, the apparatus 200 includes a docking station 210 and a portable device 220 having a motherboard 230 that has been modified from the typical known configuration of the motherboard 2 shown in FIG. 1. In particular, unlike the motherboard 2 shown in FIG. 1, the motherboard 230 shown in FIG. 3 does not include a southbridge IC. Rather, the docking station 210 includes a southbridge IC 240, which, in turn, includes a SerDes component 242. The southbridge IC 240 of the docking station 210 is mounted on a PCB 250 of the docking station 210. The PCB 250 has I/O ports 255 for interfacing the docking station 210 with one or more peripheral devices 212, which are labeled PERIPH. 1-PERIPH. N in FIG. 2. One or more of the ports 255 are typically parallel ports while one or more of the ports 255 are typically serial ports.

The motherboard 230 of the portable device 220 includes a CPU 260 and typically includes one or more of the components of the motherboard 2 shown in FIG. 1, such as a northbridge IC 261, for example. For ease of illustration and discussion, these other components are not shown in FIG. 3. The configuration of the motherboard 230 shown in FIG. 3 is similar to the configuration of the motherboard 130 shown in FIG. 2, except that unlike the configuration of the motherboard 130 shown in FIG. 2, the northbridge IC 261 mounted on the motherboard 230 is in the communication path between the CPU 260 and the southbridge IC 240, which has been moved to the PCB 250 of the docking station 210.

The CPU 260 outputs parallel bit streams of data, which are received and processed by the northbridge IC 261 in a manner similar or identical to the manner in which the northbridge IC 4 shown in FIG. 1 receives and processes parallel bit streams of data in order to perform the typical northbridge functions. The invention, however, is not limited with respect to the logical configuration of the northbridge IC 261 or with respect to the functions it performs. The northbridge IC 261 outputs a parallel bit stream to a SerDes component 262 located on the motherboard 230 of the portable device 220. The SerDes component receives the parallel bit stream and converts it into a serial bit stream. The serial bit stream is then output from a serial port 232 of the motherboard 230 and communicated serially over the high-speed serial communications link 270 to the docking station 210. It should be noted that the SerDes component 262 may be eliminated if the northbridge IC 261 is configured to perform a SerDes algorithm. In the latter case, the northbridge IC 261 serializes bits inside of the CPU 260 and outputs a serial bit stream directly to serial port 232, which then outputs the serial bit stream onto the high-speed serial communications link 270 for transmission to the docking station 210.

At the docking station 210, the serial bit stream is input to a serial port 252 of the PCB 250, which is connected to a serial I/O port 243 of the southbridge IC 240. In the southbridge IC 240, logic (not shown) identifies one of the peripheral devices 212 as the intended target for the received bits. If the peripheral device 212 to which the bit stream is targeted serially interfaces with the docking station 210, then it is possible that no conversion is performed by the SerDes component 242 of the docking station 210. In this case, the serial bit stream may be sent to the corresponding peripheral device 212 via the corresponding I/O port 255 of the PCB 250. If the serial bits that are transmitted over the high-speed communications link 270 are intended for two or more peripheral devices 212 that interface with respective serial I/O ports 255 of the docking station 210, then the SerDes component 242 typically performs a multiplexing operation that deserializes and multiplexes the bits so that they are sent to the appropriate I/O ports 255. It should be noted that the southbridge IC 240 may perform some other processing or conditioning of the serial bit stream before it is sent to the corresponding peripheral device 212.

If the peripheral device 212 identified as the target device by the southbridge IC 240 is connected to an I/O port 255 that provides a parallel interface, then the serial bit stream received at I/O port 252 is converted by the SerDes component 242 into a corresponding parallel bit stream before being sent to the corresponding peripheral device 212. The parallel bit stream is then sent to the corresponding peripheral device 212 via the corresponding parallel I/O port 255 of the PCB 250. The SerDes component 240 typically contains multiple SerDes devices (not shown) for performing multiple different types of serial-to-parallel and parallel-to-serial conversions. For example, two of the I/O ports 255 may both be parallel ports, but may yet be different in that they support different numbers of bits and thus use connectors having different pin counts. Therefore, the serial-to-parallel conversion processes performed for data bits destined for these two ports will be different. For example, assuming that the two I/O ports 255 that are connected to the peripheral devices labeled PERIPH. 1 and PERIPH. N are sixteen and thirty-two bit ports, respectively, one SerDes device (not shown) of the SerDes component 242 will perform a serial-to-parallel conversion process that converts sixteen serial bits into sixteen parallel bits and the other will perform a serial-to-parallel conversion process that converts thirty-two serial bits into thirty-two parallel bits.

The embodiment of the invention shown in FIG. 3 has similar advantages to the embodiment shown in FIG. 2. Providing the docking station 210 with the southbridge IC 240 enables the communications link 270 between the portable device 220 and the docking station 210 to be a serial link. Because a serial link as opposed to the parallel link is used for this purpose, a connector (not shown) having a low pin count may be used to connect the docking station 210 with the portable device 220. Such a connector may have, for example, as few as one to four pins, which enables the connector to have a small form factor and be capable of being manufactured at relatively low cost with relatively high manufacturing yield. Consequently, the receptacle for receiving the connector on the portable device 220 and the corresponding contact area on the motherboard 230 can be made smaller, which results in corresponding reduced footprints on the housing of the portable device 220 and on the contact area on the motherboard 230. The reduced footprint on the motherboard 230 facilitates the goals of achieving high component density and providing increased functionality on the motherboard 230 without having to increase the overall size of the motherboard 230 or of the portable device 220.

Figure 4:
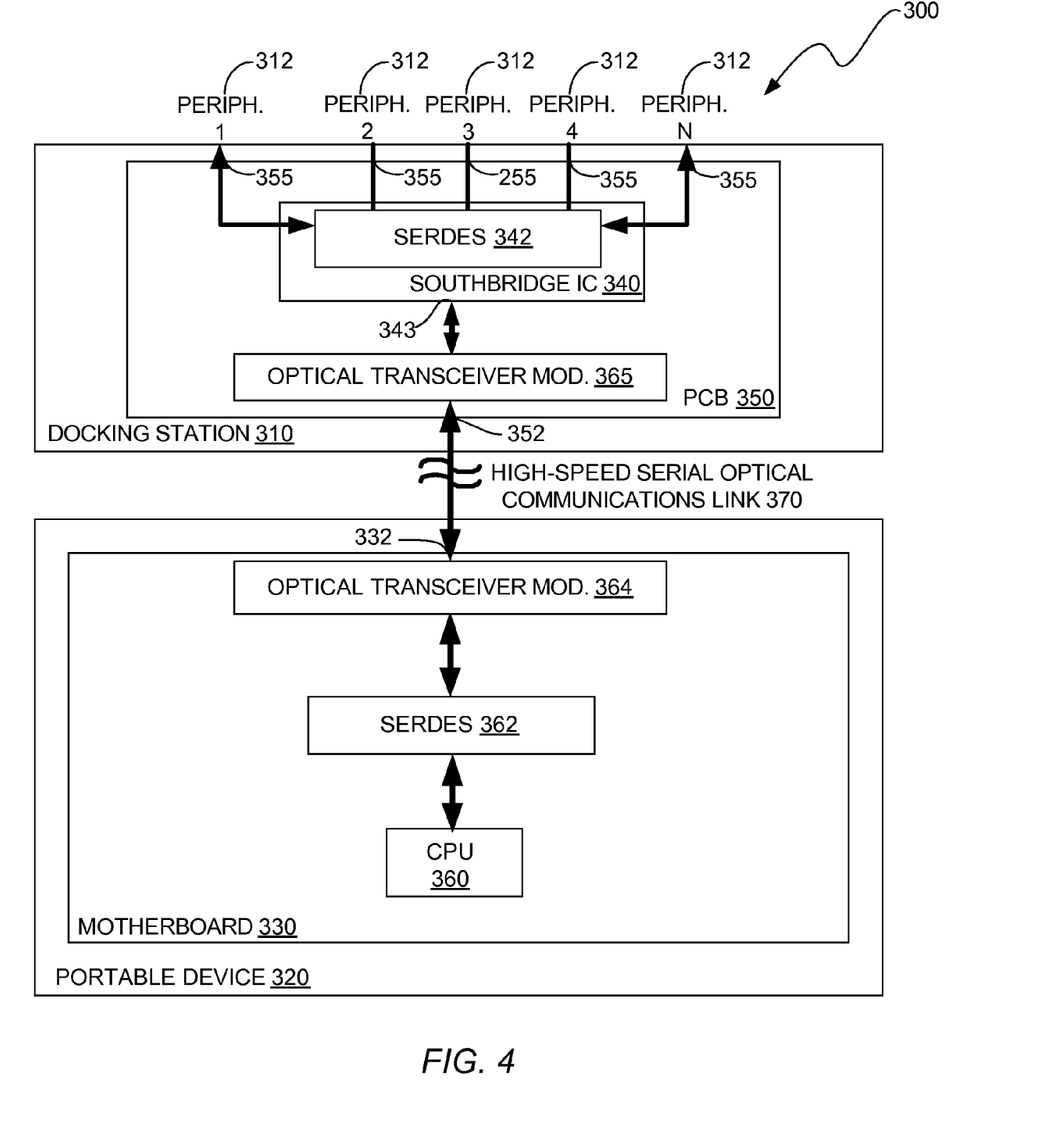
FIG. 4 illustrates a block diagram of the apparatus of the invention in accordance with another illustrative or exemplary embodiment.

FIG. 4 illustrates a block diagram of the apparatus 300 of the invention in accordance with another illustrative or exemplary embodiment. In accordance with this embodiment, the apparatus 300 includes a docking station 310 and a portable device 320. The portable device 320 has a motherboard 330 that has been modified from the typical known configuration of the motherboard 2 shown in FIG. 1. In particular, unlike the motherboard 2 shown in FIG. 1, the motherboard 330 shown in FIG. 4 at least does not include a southbridge IC. Rather, the docking station 310 includes a southbridge IC 340, which, in turn, includes a SerDes component 342. In addition, unlike the motherboard 2 shown in FIG. 1, the motherboard 330 shown in FIG. 4 includes an optical transceiver module 364, as will be described below in more detail.

The docking station 310 includes a PCB 350. The docking station includes an optical transceiver module 365. The southbridge IC 340 and optical transceiver module 365 of the docking station 310 are mounted on the PCB 350 of the docking station 310. The PCB 350 has I/O ports 355 for interfacing the docking station 310 with one or more peripheral devices 312, which are labeled PERIPH. 1-PERIPH. N in FIG. 4. One or more of the I/O ports 355 of the docking station are typically parallel ports while one or more of the ports 355 are typically serial ports.

The motherboard 330 of the portable device 320 includes a CPU 360 and typically includes one or more of the components of the motherboard 2 shown in FIG. 1, such as a northbridge IC (not shown), for example. For ease of illustration and discussion, these other components are not shown in FIG. 4. The CPU 360 outputs parallel bit streams of data, which are received by a SerDes component 362 located on the motherboard 330 of the portable device 320. The SerDes component 362 converts the parallel bit stream into a serial bit stream, which is then output to the optical transceiver module 364. In accordance with this embodiment, the optical transceiver module 364 has a single transmit channel (not shown) and a single receive channel (not shown) for simultaneously transmitting and receiving data. The transmit channel includes an electrical-to-optical (E/O) element (not shown), such as a laser diode or light emitting diode (LED), and a driver circuit (not shown) that drives the E/O element. The receive channel includes an optical-to-electrical (O/E) element (not shown), such as a photodiode, and receiver circuitry (not shown), such as an amplifier circuit, a filter circuit, a clock and data recovery (CDR) circuit, etc.

The optical transceiver module 364 uses the serial bit stream on the transmit channel to modulate the E/O element (not shown) of the module 364. The E/O element generates an optical data signal comprising the data bits and outputs the optical data signal via port 332 onto a high-speed serial optical data link 370. The serial optical data link 370 may include an optical waveguide (not shown), such as, for example, an optical fiber cable, having respective connectors (not shown) on each end for mating with respective receptacles (not shown) on the docking station 310 and on the portable device 120. Alternatively, the optical data link 370 may be simply an air interface that does not require an optical waveguide. It should be noted that the SerDes component 362 may be eliminated if the CPU 360 is configured to perform a SerDes algorithm. In the latter case, the CPU 360 serializes bits inside of the CPU 360 and outputs a serial bit stream directly to serial port 332, which then outputs the serial bit stream to the optical transceiver module 364.

At the docking station 310, the optical transceiver module 365 receives the optical data signal transmitted over the link 370. The optical transceiver module 365 of the docking station 310 has a single transmit channel (not shown) and a single receive channel (not shown) for simultaneously transmitting and receiving data. The transmit channel includes an E/O element (not shown), such as a laser diode or LED, and a driver circuit (not shown) that drives the E/O element. The receive channel includes an O/E element (not shown), such as a photodiode, and receiver circuitry (not shown), such as an amplifier circuit, a filter circuit, a CDR circuit, etc. The O/E element of the transceiver module 365 converts the optical data signal received over the link 370 into an electrical data signal. Other circuitry (not shown) of the optical transceiver module 365 conditions and processes the electrical data signal to recover the data bits. The optical transceiver 365 outputs the recovered bits as a serial bit stream to the southbridge IC 340. Logic (not shown) in the southbridge IC 340 identifies one of the peripheral devices 312 as the intended target for the bit stream. If the peripheral device 312 to which the bit stream is targeted serially interfaces with the docking station 310, then it is possible that no conversion will need to be performed by the SerDes component 342 of the docking station 310. In this case, the southbridge IC 340 or other electrical circuitry of the docking station CB 310 causes the serial bit stream to be sent to the corresponding peripheral device 312 via the corresponding I/O port 355 of the PCB 350. It should be noted that the southbridge IC 340 may perform some other processing or conditioning of the serial bit stream before it is sent to the corresponding peripheral device 312.

If the peripheral device 312 identified as the target device by the logic of the southbridge IC 340 is connected to an I/O port 355 that provides a parallel interface, then the serial bit stream is converted by the SerDes component 342 into a corresponding parallel bit stream before being sent to the corresponding peripheral device 312. The parallel bit stream is then sent to the corresponding peripheral device 312 via the corresponding parallel I/O port 355 of the PCB 350.

The embodiment of the invention shown in FIG. 4 and described above has similar advantages to the embodiments described above with reference to FIGS. 2 and 3, e.g., the connector (not shown) that connects to the docking station 310 to the portable device 320 may have a low pin count and provide the aforementioned advantages. An additional advantage of the embodiment shown in FIG. 4 is that the optical communications link 370 can be made up of, for example, one or two optical fibers. A cable that contains a single optical fiber can be made with end connectors that are very small in size (i.e., very small form factors), which provides the aforementioned advantages. In addition, in many cases, such an optical link provides improved signal integrity and increased speed, or bandwidth.

Figure 5:
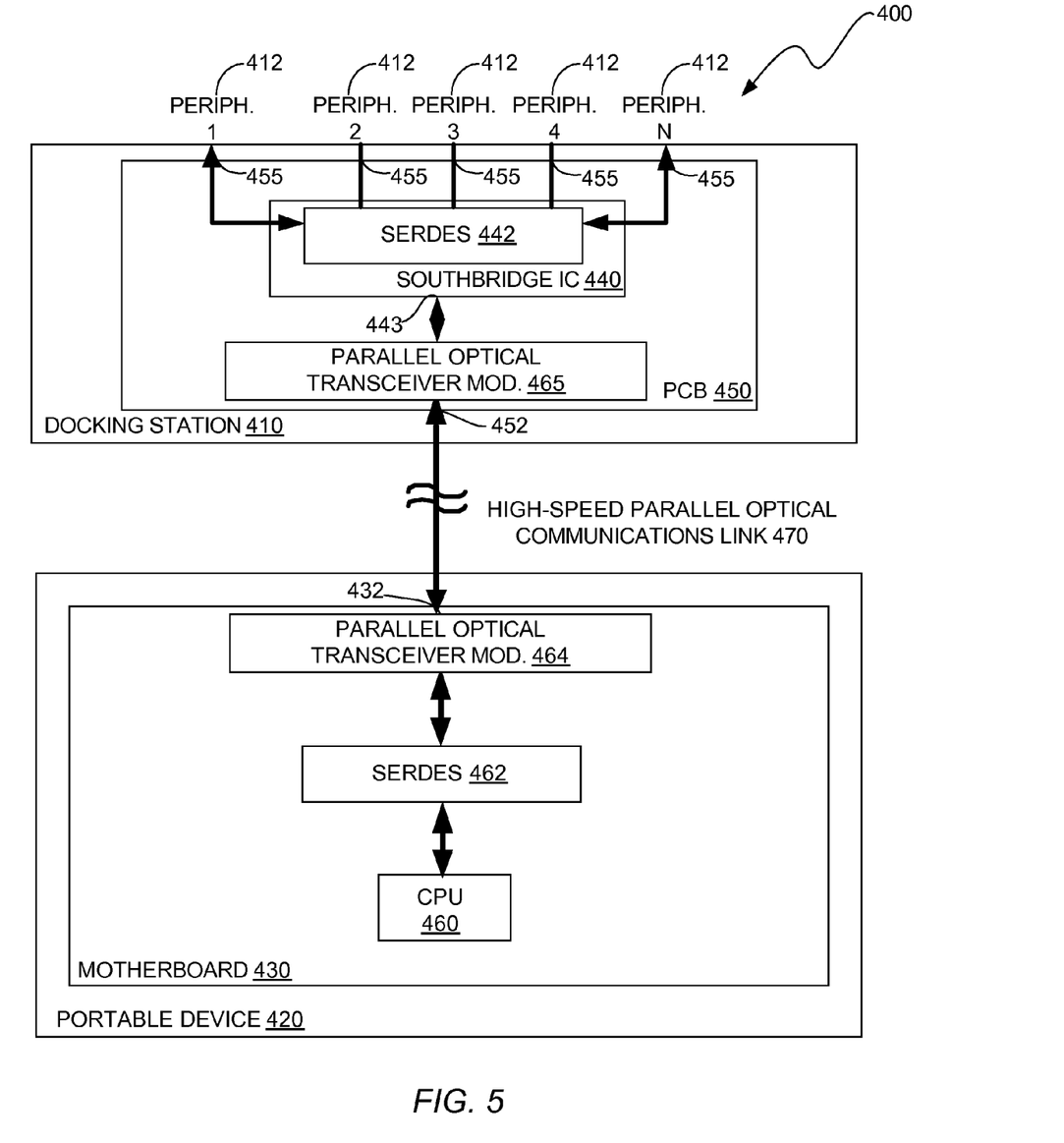
FIG. 5 illustrates a block diagram of the apparatus of the invention in accordance with another illustrative or exemplary embodiment.

FIG. 5 illustrates a block diagram of the apparatus 400 of the invention in accordance with another illustrative or exemplary embodiment. The apparatus 400 shown in FIG. 5 is identical to the apparatus 300 shown in FIG. 3, except that the optical transceiver modules 464 and 465 of the portable device 420 and of the docking station 410, respectively, are parallel optical transceiver modules that each have multiple transmit channels (not shown) and multiple receive channels (not shown). By using parallel optical transceiver modules 464 and 465 for these purposes, the bandwidth of the optical communications link 470 can be increased in comparison to the bandwidth of the optical communications link 370 shown in FIG. 4. The parallel optical communications link 470 is made up of a plurality of parallel optical waveguides, such as a plurality of optical fibers (not shown) contained within an optical fiber ribbon cable (not shown).

The portable device 420 has a motherboard 430 that has been modified from the typical known configuration of the motherboard 2 shown in FIG. 1. In particular, unlike the motherboard 2 shown in FIG. 1, the motherboard 430 shown in FIG. 5 does not include a southbridge IC. Rather, the docking station 410 includes a southbridge IC 440, which, in turn, includes a SerDes component 442. The southbridge IC 440 and optical transceiver module 465 of the docking station 410 are mounted on the PCB 450 of the docking station 410. The PCB 450 has I/O ports 455 for interfacing the docking station 410 with one or more peripheral devices 412, which are labeled PERIPH. 1-PERIPH. N in FIG. 5. One or more of the I/O ports 455 of the docking station are typically parallel ports while one or more of the ports 455 are typically serial ports.

The motherboard 430 of the portable device 420 includes a CPU 460, a SerDes component 462 and the parallel optical transceiver module 464. The motherboard 430 typically includes one or more of the components of the motherboard 2 shown in FIG. 1, such as a northbridge IC (not shown), for example. For ease of illustration and discussion, these other components are not shown in FIG. 5. The CPU 460 outputs bit streams that are input to the SerDes component 462. The SerDes component 462 converts the bit streams received thereby into bit streams that are suitable for being input to the parallel optical transceiver module 464. As indicated above, the optical transceiver module 464 has multiple transmit channels and multiple receive channels. For example, the transceiver module 464 may have six parallel transmit channels and six parallel receive channels, in which case the SerDes component 462 would provide six parallel bit streams to the transceiver module 464 for transmission over the six transmit channels of the parallel optical transceiver module 464. Each transmit channel includes an E/O element (not shown), such as a laser diode or LED, and a driver circuit (not shown) that drives the E/O element. Each receive channel includes an O/E element (not shown), such as a photodiode, and receiver circuitry (not shown), such as an amplifier circuit, a filter circuit, a CDR circuit, etc. It should be noted that the SerDes component 462 may be eliminated if the CPU 460 is configured to perform a SerDes algorithm. In the latter case, the CPU 460 serializes bits inside of the CPU 460 and outputs a serial bit stream directly to serial port 432, which then outputs the serial bit stream to the parallel optical transceiver module 464. The parallel optical transceiver module 464 outputs multiple optical data signals in parallel over the parallel optical communications link 470.

The parallel optical transceiver module 465 of the docking station 410 receives these optical data signals in parallel and converts the parallel optical data signals into parallel bit streams. The optical transceiver module 465 outputs the parallel bit streams to the southbridge IC 440. Logic (not shown) in the southbridge IC 440 identifies one or more of the peripheral devices 412 as the intended target or targets for the bit streams. The bit streams may or may not be input to the SerDes component 442 of the southbridge IC 440, depending on whether or not some type of conversion is needed before sending the bits to the targeted peripheral device or devices 412. The bits are then sent by the southbridge IC 440, with or without conversion by the SerDes component 442, to the targeted peripheral devices or devices 412 via the corresponding I/O port or ports 455 of the docking station 410.

The embodiment of the invention shown in FIG. 5 and described above has similar advantages to the embodiments described above with reference to FIGS. 2, 3 and 4, e.g., the connector (not shown) that connects to the docking station 410 to the portable device 420 may have a low pin count, and thereby provide the aforementioned advantages.

Figure 6:
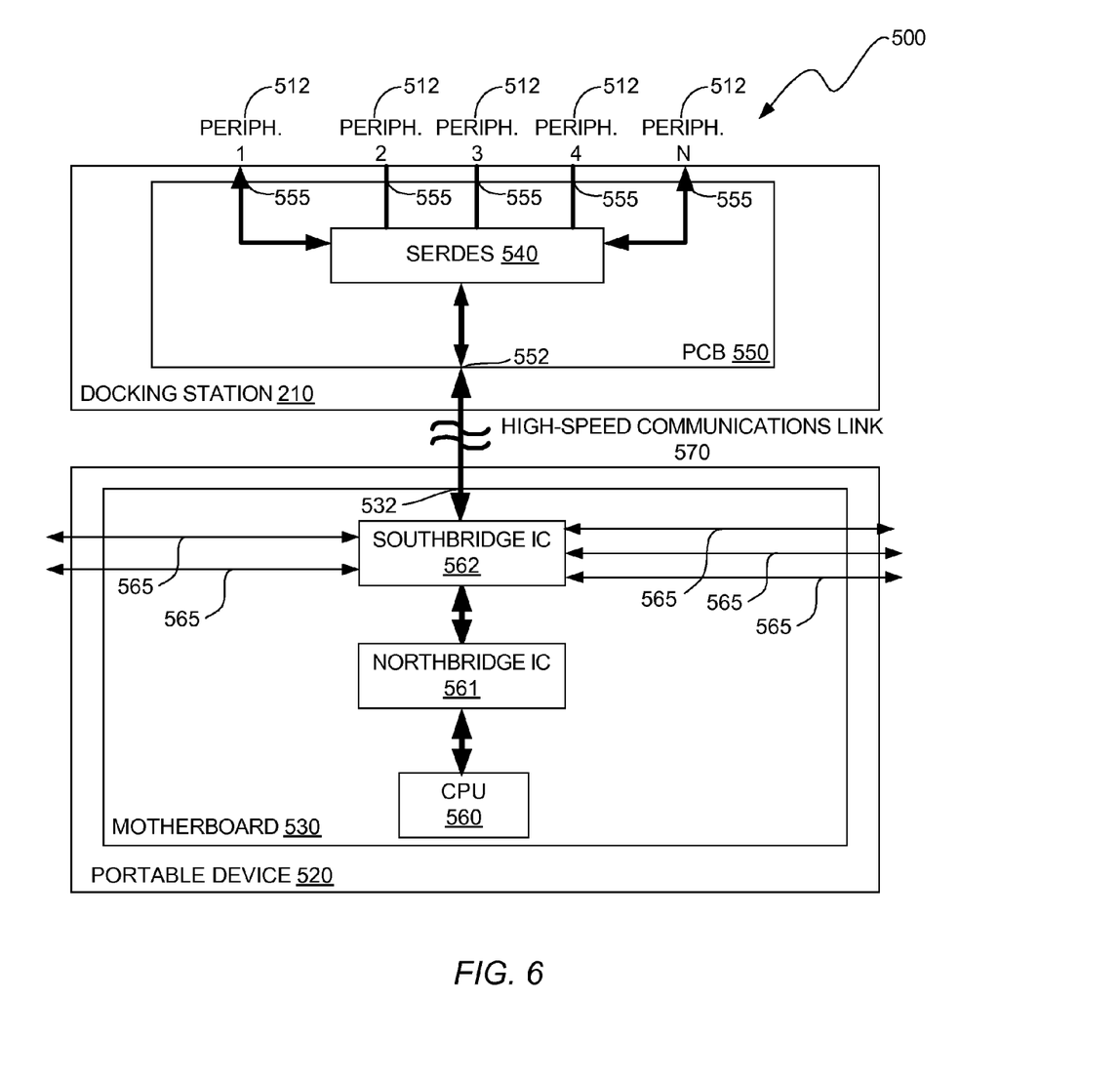
FIG. 6 illustrates a block diagram of the apparatus of the invention in accordance with another illustrative or exemplary embodiment.

FIG. 6 illustrates a block diagram of the apparatus 500 of the invention in accordance with another illustrative or exemplary embodiment. In accordance with this embodiment, the portable device 520 includes a motherboard 530 that may be similar or identical to the motherboard 2 of typical known notebook computer shown in FIG. 1 in that the motherboard 530 includes at least a CPU 560, a northbridge IC 561 and a southbridge IC 562. However, unlike a typical known docking station, the docking station 510 shown in FIG. 6 includes a SerDes component 540. The SerDes component 540 is mounted on a PCB 550 of the docking station 510. The PCB 550 has I/O ports 555 for interfacing the docking station 510 with one or more peripheral devices 512, which are labeled PERIPH. 1-PERIPH. N in FIG. 6. One or more of the ports 555 are typically parallel ports while one or more of the ports 555 are typically serial ports.

The motherboard 530 of the portable device 520 may include components in addition to the CPU 560, the northbridge IC 561 and the southbridge IC 562, such as one or more of the components 6, 7, 8, 9, 11, and 12 of the motherboard 2 shown in FIG. 1. For ease of illustration and discussion, these other components are not shown in FIG. 6. The CPU 560 outputs parallel bit streams to the northbridge IC 561, which performs typical northbridge functions, i.e., memory controller functions. The northbridge IC 561 outputs parallel bit streams to the southbridge IC 562, which performs typical southbridge functions, i.e., typical I/O operations. The southbridge IC 562 has I/O ports 565 for communicating with peripheral devices (not shown). The southbridge IC 562 outputs a serial bit stream via port 532 onto a high-speed serial communications link 570.

The serial bit stream carried on link 570 is input via port 552 of the docking station PCB 550 to the SerDes component 540 of the docking station 510. If the peripheral device 512 to which the bit stream is targeted serially interfaces with the docking station 510, then no conversion is performed by the SerDes component 540 of the docking station 510. In this case, the serial bit stream is sent to the corresponding peripheral device 512 via the corresponding I/O port 555 of the PCB 550. If the peripheral device 512 identified as the target device by the southbridge IC 540 is connected to an I/O port 555 that provides a parallel interface, then the serial bit stream received at I/O port 552 is converted by the SerDes component 540 into a corresponding parallel bit stream before being sent to the corresponding peripheral device 512. The parallel bit stream is then sent to the corresponding peripheral device 512 via the corresponding parallel I/O port 555 of the PCB 550. The SerDes component 540 typically contains multiple SerDes devices (not shown) for performing multiple different types of serial-to-parallel and parallel-to-serial conversions.

The embodiment of the invention described above with reference to FIG. 6 has similar advantages to those described above with reference to other embodiments of the invention. For example, providing the docking station 510 with the SerDes component 540 enables the communications link 570 to be a serial link. Because a serial link is used for this purpose, a connector (not shown) having a low pin count may be used to connect the docking station 510 with the portable device 520, which provides the aforementioned advantages associated with using a connector for the link that has a low pin count.

Figure 7:
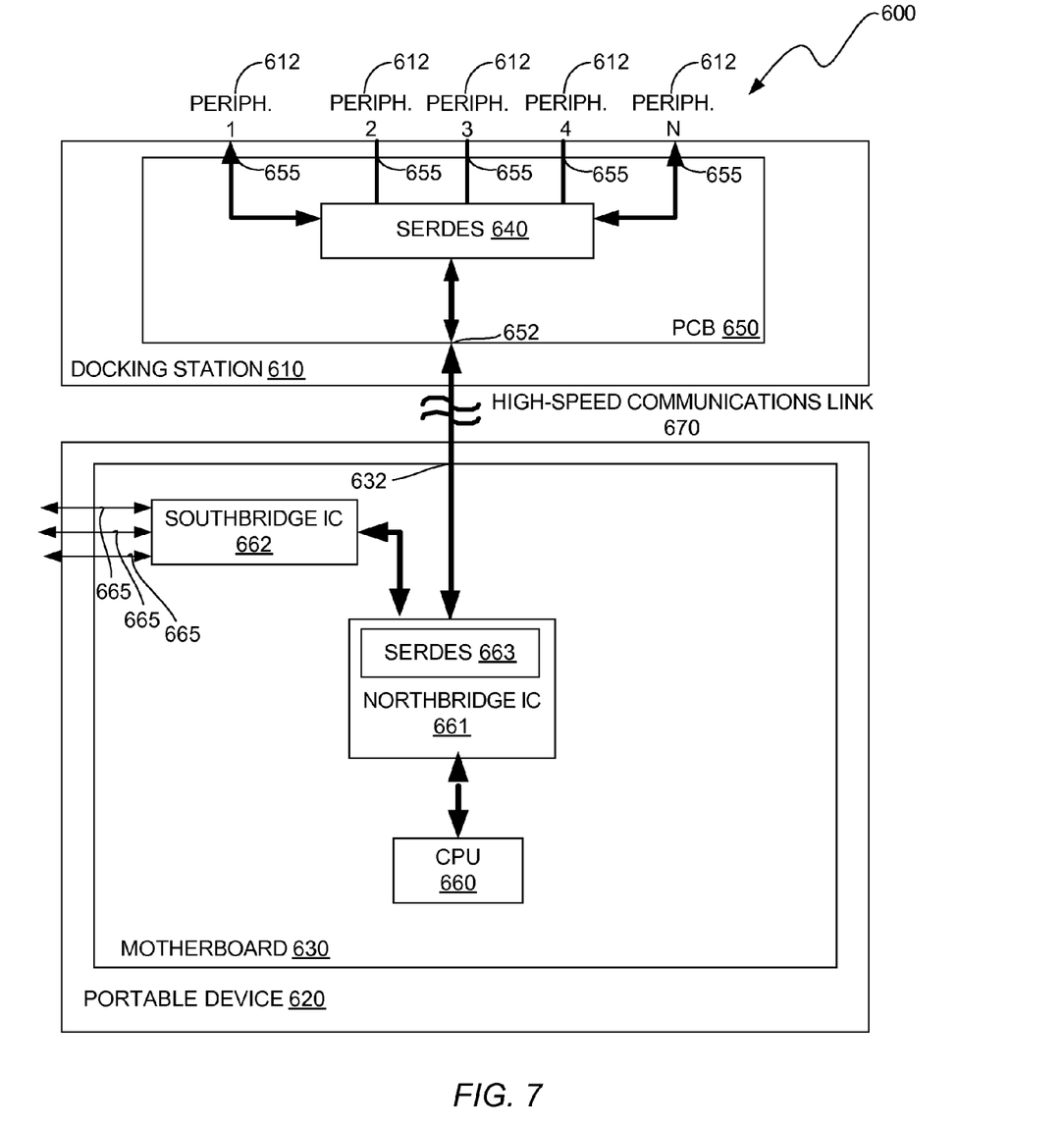
FIG. 7 illustrates a block diagram of the apparatus of the invention in accordance with another illustrative or exemplary embodiment.

FIG. 7 illustrates a block diagram of the apparatus 600 of the invention in accordance with another illustrative or exemplary embodiment. In accordance with this embodiment, a portable device 620 communicates with a docking station 610 via a high-speed serial communications link 670. The portable device 620 includes a motherboard 630 that may be similar or identical to the motherboard 2 of typical known notebook computer shown in FIG. 1 in that the motherboard 630 includes at least a CPU 660, a northbridge IC 661 and a southbridge IC 662. However, unlike a typical known docking station, the docking station 610 shown in FIG. 7 includes a SerDes component 640. The SerDes component 640 is mounted on a PCB 650 of the docking station 610. The PCB 650 has I/O ports 655 for interfacing the docking station 610 with one or more peripheral devices 612, which are labeled PERIPH. 1-PERIPH. N in FIG. 7. One or more of the ports 655 are typically parallel ports while one or more of the ports 655 are typically serial ports.

The motherboard 630 of the portable device 620 shown in FIG. 7 is very similar to the motherboard 530 shown in FIG. 6 and described above except that the southbridge IC 662 is not in the communication path between the northbridge IC 661 and the high-speed serial communications link 670. Rather, the northbridge IC 661 rather than the southbridge IC 662 is connected to the link 670. The motherboard 630 may include components in addition to the CPU 660, the northbridge IC 661 and the southbridge IC 662, such as one or more of the components 6, 7, 8, 9, 11, and 12 of the motherboard 2 shown in FIG. 1. For ease of illustration and discussion, these other components are not shown in FIG. 7.

The CPU 660 outputs parallel bit streams to the northbridge IC 661, which performs typical northbridge functions, i.e., memory controller functions. The northbridge IC 661 outputs parallel bit streams to the southbridge IC 662, which performs typical southbridge functions, i.e., typical I/O operations. The southbridge IC 662 has I/O ports 665 for communicating with peripheral devices (not shown). The northbridge IC 661 preferably also includes a SerDes component 663 that converts parallel bit streams intended for peripheral devices 612 into a serial bit stream. The serial bit stream is output via a port 632 onto the high-speed serial communications link 670. Alternatively, the SerDes component 663 may be external to the northbridge IC 661 and interposed in between the northbridge IC 661 and the I/O port 632.

The serial bit stream carried on link 670 is input via port 652 of the docking station PCB 650 to the SerDes component 640 of the docking station 610. If the peripheral device 612 to which the bit stream is directed serially interfaces with the docking station 610, then it is possible that no conversion will be performed by the SerDes component 640 of the docking station 610. In this case, the serial bit stream may bypass the SerDes component 640 and be sent by electrical circuitry of the PCB 650 to the corresponding peripheral device 612 via the corresponding I/O port 655 of the PCB 650. If the serial bits that are transmitted over the high-speed communications link 670 are intended for two or more peripheral devices 612 that interface with respective serial I/O ports 655 of the docking station 610, then the SerDes component 642 typically performs a multiplexing operation that deserializes and multiplexes the bits so that they are sent to the appropriate I/O ports 655. If the peripheral device 612 to which the bits are directed is connected to an I/O port 655 that provides a parallel interface, then the serial bit stream is converted by the SerDes component 640 into a corresponding parallel bit stream before being sent to the corresponding peripheral device 612. The parallel bit stream is then sent to the corresponding peripheral device 612 via the corresponding parallel I/O port 655 of the PCB 650. The SerDes component 640 typically contains multiple SerDes devices (not shown) for performing multiple different types of serial-to-parallel and parallel-to-serial conversions.

The embodiment of the invention described above with reference to FIG. 7 has similar advantages to those described above with reference to other embodiments of the invention. For example, providing the docking station 610 with the SerDes component 640 enables the communications link 670 to be a serial link. Because a serial link is used for this purpose, a connector (not shown) having a low pin count may be used to connect the docking station 610 with the portable device 620, which provides the aforementioned advantages associated with using a connector for the link that has a low pin count.

Figure 8:
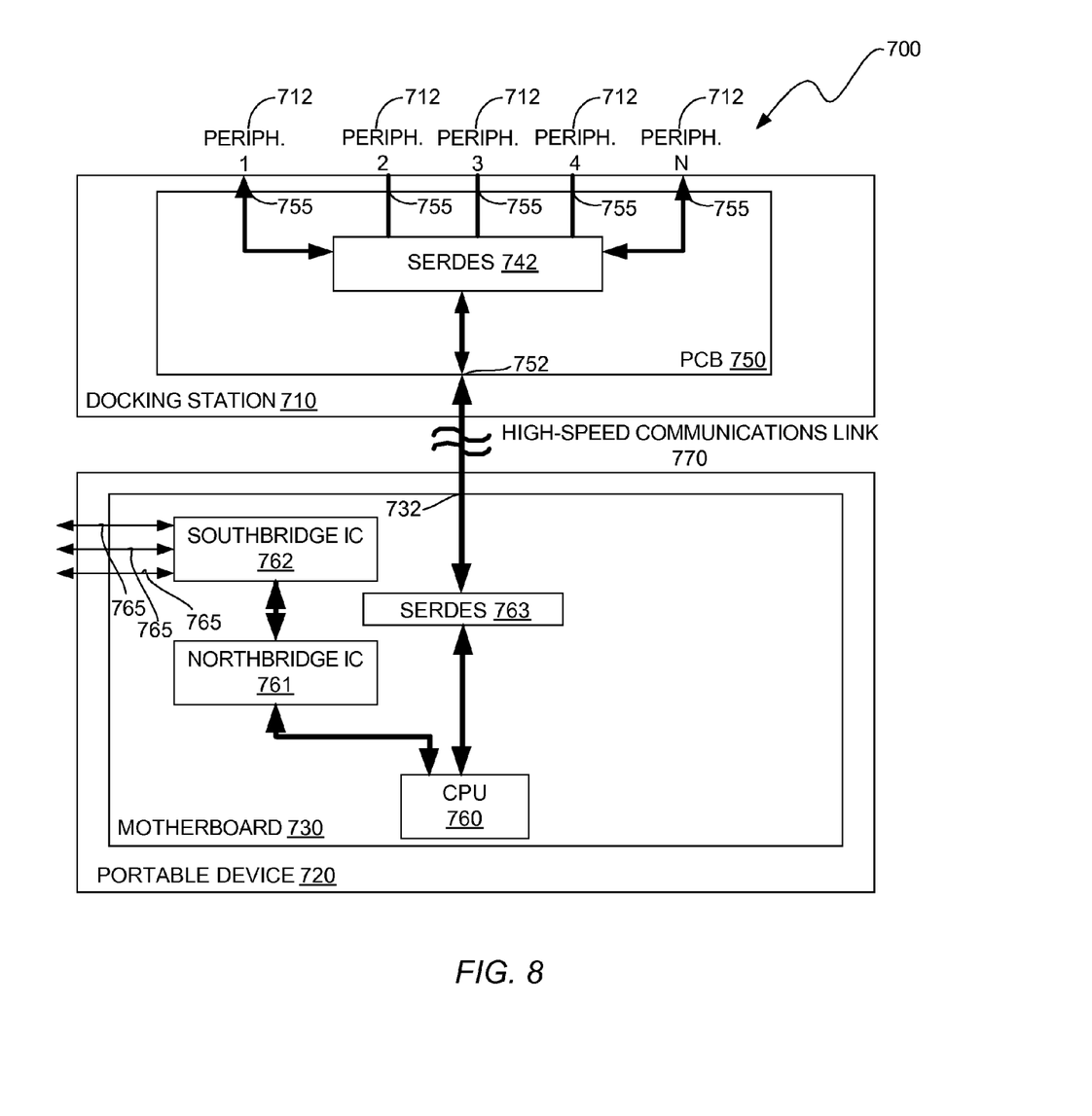
FIG. 8 illustrates a block diagram of the apparatus of the invention in accordance with another illustrative or exemplary embodiment.

FIG. 8 illustrates a block diagram of the apparatus 700 of the invention in accordance with another illustrative or exemplary embodiment. In accordance with this embodiment, a portable device 720 communicates with a docking station 710 via a high-speed serial communications link 770. The portable device 720 includes a motherboard 730 that may be similar or identical to the motherboard 2 of typical known notebook computer shown in FIG. 1 in that the motherboard 730 includes at least a CPU 760, a northbridge IC 761 and a southbridge IC 762. However, unlike a typical known docking station, the docking station 710 shown in FIG. 8 includes a SerDes component 740. The SerDes component 740 is mounted on a PCB 750 of the docking station 710. The PCB 750 has I/O ports 755 for interfacing the docking station 710 with one or more peripheral devices 712, which are labeled PERIPH. 1-PERIPH. N in FIG. 8. One or more of the ports 755 are typically parallel ports while one or more of the ports 755 are typically serial ports.

The motherboard 730 of the portable device 720 shown in FIG. 8 is very similar to the motherboard 630 shown in FIG. 7 and described above except that the northbridge IC 761 of the motherboard 730 is not in the communication path between the CPU 760 and the high-speed serial communications link 770. Rather, the CPU 760 is connected to a SerDes component 763, which, in turn, is connected to the link 770. The motherboard 730 may include components in addition to the CPU 760, the northbridge IC 761, the southbridge IC 762, and the SerDes component 763. For example, the motherboard 730 may also include one or more of the components 6, 7, 8, 9, 11, and 12 of the motherboard 2 shown in FIG. 1. For ease of illustration and discussion, these other components are not shown in FIG. 8.

The CPU 760 outputs parallel bit streams to the northbridge IC 761, which performs typical northbridge functions, i.e., memory controller functions. The northbridge IC 761 outputs parallel bit streams to the southbridge IC 762, which performs typical southbridge functions, i.e., typical I/O operations. The southbridge IC 762 has I/O ports 765 for communicating with peripheral devices (not shown). The CPU 760 outputs parallel bit streams intended for the peripheral devices 712. These parallel bit streams that are output from the CPU 760 and intended for the peripheral devices 712 are input to the SerDes component 763, which converts the parallel bit streams into a serial bit stream. The serial bit stream is output via port 732 onto the high-speed serial communications link 770. It should be noted that the SerDes component 763 may be eliminated if the CPU 760 is configured to perform a SerDes algorithm. In the latter case, the CPU 760 serializes bits inside of the CPU 760 and outputs a serial bit stream directly to serial port 732, which then outputs the serial bit stream onto the high-speed serial communications link 770 for transmission to the docking station 710.

The serial bit stream carried on link 770 is input via port 752 of the docking station PCB 750 to the SerDes component 740 of the docking station 710. If the peripheral device 712 to which the bit stream is targeted serially interfaces with the docking station 710, then it is possible that no conversion will need to be performed by the SerDes component 740 of the docking station 710. In this case, the serial bit stream bypasses the SerDes component 742 and is sent by electrical circuitry of the PCB 750 to the corresponding peripheral device 712 via the corresponding I/O port 755 of the PCB 750. If the peripheral device 712 to which the bits are directed is connected to an I/O port 755 that provides a parallel interface, then the serial bit stream received at I/O port 752 is converted by the SerDes component 740 into a corresponding parallel bit stream before being sent to the corresponding peripheral device 712. The parallel bit stream is then sent to the corresponding peripheral device 712 via the corresponding parallel I/O port 755 of the PCB 750. If the serial bits that are transmitted over the high-speed communications link 770 are intended for two or more peripheral devices 712 that interface with respective serial I/O ports 755 of the docking station 710, then the SerDes component 742 typically performs a multiplexing operation that deserializes and multiplexes the bits so that they are sent to the appropriate I/O ports 755. The SerDes component 742 typically contains multiple SerDes devices (not shown) for performing multiple different types of serial-to-parallel and parallel-to-serial conversions.

The embodiment of the invention described above with reference to FIG. 8 has similar advantages to those described above with reference to other embodiments of the invention. For example, providing the docking station 710 with the SerDes component 742 enables the communications link 770 to be a serial link. Because a serial link is used for this purpose, a connector (not shown) having a low pin count may be used to connect the docking station 710 with the portable device 720, which provides the aforementioned advantages associated with using a connector for the link that has a low pin count.

It should be noted that although the embodiments described above with reference to FIGS. 2-8 refer to an apparatus that includes a docking station, a portable device and a high-speed communications link between them, the apparatus of the invention may include the docking station only, the portable device only, the high-speed link only, or a combination of two or more of the docking station, the portable device, and the link. As will now be described with reference to FIG. 9, the invention also provides methods for communicating data over a high-speed link between a portable device and a docking station.

Figure 9:
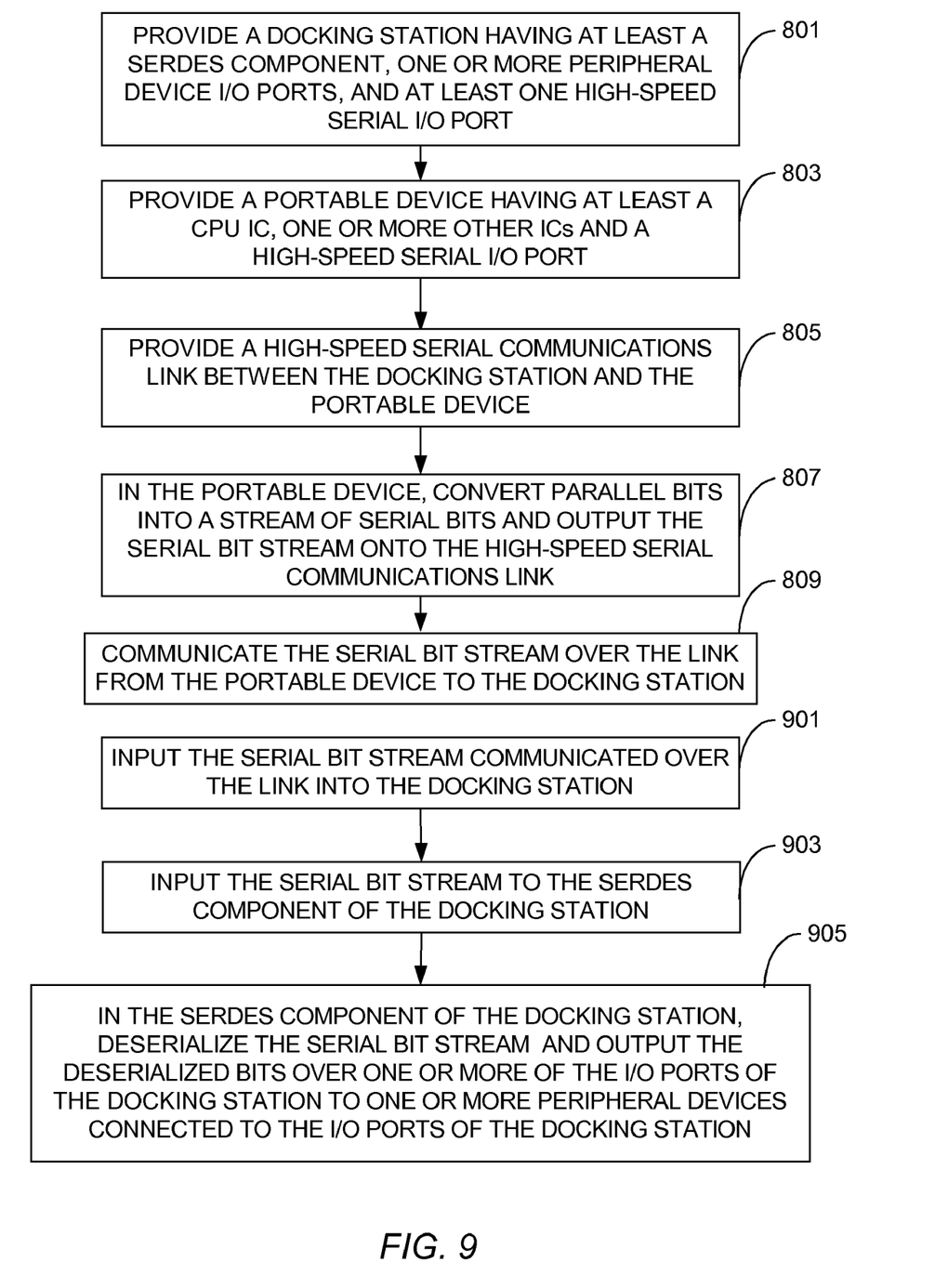
FIG. 9 illustrates a flowchart that represents the method of the invention in accordance with an illustrative embodiment.

FIG. 9 illustrates a flowchart that represents a method in accordance with an illustrative embodiment for communicating data over a high-speed link between a portable device and a docking station. A docking station is provided with a circuit board having at least a SerDes component mounted thereon and a high-speed serial I/O port for connection with a high-speed serial communications link, as indicated by block 801. A portable device is provided with a high-speed serial I/O port for connection with a high-speed serial communications link, as indicated by block 803. A high-speed serial communications link is provided that links the high-speed serial I/O port of the docking station with the high-speed serial I/O port of the portable device, as indicated by block 805. Parallel bit streams containing bits that are intended for one or more peripheral devices connected to one or more I/O ports of the docking station are converted into a serial bit stream by a SerDes component of the portable device and output onto the high-speed serial communications link via the high-speed serial I/O port of the portable device, as indicated by block 807. The bits are communicated over the link to the high-speed serial I/O port of the docking station, as indicated by block 809. The serial bit stream communicated over the high-speed serial link are input to the docking station via the high-speed I/O port of the docking station, as indicated by block 901. The serial bit stream input to the docking station is input to the SerDes component of the docking station, which deserializes the serial bit stream, as indicated by block 903. The deserialized bits are output via a one or more of the peripheral device I/O ports of the docking station to one or more peripheral devices connected to the peripheral device I/O ports of the docking station, as indicated by block 905.

It should be noted that the invention has been described with reference to a few illustrative embodiments in order to demonstrate the principles and concepts of the invention. The invention, however, is not limited to the embodiments described herein, as will be understood by persons of ordinary skill in the art in view of the description provided herein. For example, although the invention has been described with reference to a portable device such as a notebook computer, the invention applies equally to other types of portable devices, such as laptop computers and other portable computing devices. Similarly, although the invention has been described in detail with reference to a docking station, the invention applies equally to port replicators and similar apparatuses. Also, although the flow of data has only been described above as flowing in the direction from the portable device to the docking station, it will be understood by those of ordinary skill in the art that, in many cases, data also flows in the direction from the docking station to the portable device. For example, peripheral devices connected to the docking station may send, for example, data, messages and/or requests to the portable device via the high-speed communication link. In the interest of brevity, the invention has only been described with reference to data flowing in the direction from the portable device to the docking station, since this is the primary direction in which data flows. Data flowing in the reverse direction undergoes processes that are essentially the same as the processes described above with reference to FIGS. 2-9, except that the order of the processes is reversed.

What is claimed is:

1. A docking station for interfacing one or more peripheral devices with a portable device if a portable device is docked on the docking station, the docking station comprising:

a circuit board (CB) having electrical circuitry thereon for communicating with one or more peripheral devices via one or more peripheral device input/output (I/O) ports of the docking station and for communicating via at least one high-speed serial I/O port of the docking station with a portable device if the portable device is docked on the docking station, wherein the high-speed serial I/O port provides a serial connection for interfacing the docking station with a high-speed serial communications link that also interfaces with a high-speed serial I/O port of a portable device if a portable device is docked on the docking station, the high-speed serial I/O port of the portable device comprising at least one serializer/deserializer (SerDes) component;

a housing, wherein the CB is secured within the housing; and at least one serializer/deserializer (SerDes) component connected to the electrical circuitry of the CB of the docking station, wherein serial bit streams received over the high-speed serial communications link via the high-speed serial I/O port of the docking station are input to the SerDes component of the docking station, the SerDes component of the docking station being configured to convert a serial bit stream input thereto into parallel bits, the electrical circuitry of the CB being configured to send one or more of the converted bits to one or more of the peripheral device I/O ports of the docking station.

2. The docking station of claim 1, wherein the high-speed serial I/O port of the docking station is a wired port configured to mate with and electrically connect with an electrical connector of an electrical cable that provides the high-speed serial communications link.

3. The docking station of claim 1, wherein the high-speed serial I/O port of the docking station is a wireless port comprising a wireless receiver, and wherein the high-speed serial communications link is a wireless link that carries bits on one or more wireless electromagnetic carrier waves, and wherein the wireless receiver receives and decodes the bits transmitted wirelessly over the link before the bits are inputted to the SerDes component of the docking station.

4. The docking station of claim 1, wherein the high-speed serial I/O port of the docking station is an optical port comprising an optical receiver module, and wherein the high-speed serial communications link is an optical link that carries bits on optical signals, and wherein the optical receiver module receives and decodes the bits transmitted as optical signals over the link before the bits are inputted to the SerDes component of the docking station.

5. The docking station of claim 4, wherein the optical receiver module is part of an optical transceiver.

6. The docking station of claim 1, wherein the electrical circuitry of the CB includes a southbridge integrated circuit (IC) mounted on the CB, and wherein the SerDes component is part of the southbridge IC.

7. A portable device comprising:

a circuit board (CB) having a substrate and a plurality of electrical conductors formed on or in the substrate;

one or more integrated circuits (ICs) mounted on the CB, said one or more ICs having one or more electrical contact pads that are electrically coupled to one or more of the electrical conductors of the CB, wherein at least one of said one or more ICs includes a serializer/deserializer (SerDes) component that converts parallel bits into a serial bit stream;

a central processing unit (CPU) IC mounted on the CB, the CPU IC having one or more electrical contact pads that are electrically coupled to one or more of the electrical conductors of the CB; and at least one high-speed serial input/output (I/O) port configured to interface the portable device with a high-speed serial communications link that interfaces the portable device with a high-speed serial I/O port of a docking station if the portable device is docked on the docking station, the high-speed serial I/O port of the docking station comprising at least one serializer/deserializer (SerDes) component, wherein if the portable device is docked on a docking station, bits that are destined for one or more peripheral devices connected to one or more peripheral device I/O ports of the docking station are sent as a serial bit stream over the high-speed serial communications link from the high-speed serial I/O port of the portable device to the high-speed serial I/O port of the docking station.

8. The portable device of claim 7, wherein the serial bit stream that is sent over the high-speed serial communications link corresponds to a group of parallel bits that have been output from the CPU IC and were sent to the SerDes component and converted by the SerDes component into the serial bit stream.

9. The portable device of claim 7, wherein at least one of said one or more ICs is a southbridge IC that includes the serializer-deserializer (SerDes) component that converts parallel bits into a serial bit stream, and wherein the serial bit stream that is sent over the high-speed serial communications link corresponds to a group of parallel bits that have been output from the CPU IC, sent to the SerDes component and converted by the SerDes component into the serial bit stream that is sent over the high-speed serial communications link.

10. The portable device of claim 7, wherein the SerDes component has conversion circuitry and electrical conductors, the electrical conductors electrically connecting the SerDes component to electrical conductors of the CB, wherein bits that are output from the CPU in parallel are received by the conversion circuitry of the SerDes component, the conversion circuitry of the SerDes component converting the parallel bits received thereby into the serial bit stream that is sent over the high-speed serial communications link.

11. The portable device of claim 7, wherein the portable device is a notebook computer.

12. The portable device of claim 10, wherein said one or more ICs include a southbridge IC and a northbridge IC, and wherein the SerDes component is separate from the northbridge and southbridge ICs and is electrically coupled to the CPU IC and to the high-speed serial I/O port of the portable device.

13. The portable device of claim 10, wherein said one or more ICs include a northbridge IC, and wherein the SerDes component is separate from the northbridge IC and is electrically coupled to the northbridge IC and to the high-speed serial I/O port of the portable device.

14. An apparatus for interfacing one or more peripheral devices connected to a docking station with a portable device that is docked on the docking station, the apparatus comprising:

a docking station comprising:
a circuit board (CB) having electrical circuitry thereon for communicating with one or more peripheral devices via one or more peripheral device input/output (I/O) ports of the docking station and for communicating via at least one high-speed serial I/O port of the docking station;
a housing, wherein the docking station CB is secured within the housing; and
at least one serializer/deserializer (SerDes) component connected to the electrical circuitry of the CB; and a portable device comprising:
a circuit board (CB) having a substrate and a plurality of electrical conductors formed on or in the substrate, the portable device CB having a plurality of I/O ports, at least one of the I/O ports of the CB being a high-speed serial I/O port;
one or more integrated circuits (ICs) mounted on the portable device CB, said one or more ICs having one or more electrical contact pads that are electrically coupled to one or more of the electrical conductors of the portable device CB, wherein at least one of said one or more ICs includes at least one serializer/deserializer (SerDes) component that converts parallel bits into a serial bit stream;
a central processing unit (CPU) IC mounted on the portable device CB, the CPU IC having one or more electrical contact pads that are electrically coupled to one or more of the electrical conductors of the portable device CB; and
at least one high-speed serial input/output (I/O) port; and a high-speed serial communications link that links the high-speed serial I/O port of the portable device to the high-speed serial I/O port of the docking station, wherein bits that are output from one or more of the ICs of the portable device and that are destined for a peripheral device connected to one or more of the peripheral device I/O ports of the docking station are output from the high-speed serial I/O port of the portable device CB as a serial bit stream onto the high-speed serial communications link, sent over the high-speed serial communications link to the docking station, received at the high-speed serial I/O port of the docking station, sent from the high-speed serial I/O port of the docking station to the SerDes component of the docking station, and converted by the SerDes component of the docking station into parallel bits, and wherein electrical circuitry of the docking station CB causes one or more of the parallel bits to be sent to one or more of the peripheral devices connected to one or more of the peripheral device I/O ports of the docking station.

15. The apparatus of claim 14, wherein the high-speed serial I/O ports of the portable device and of the docking station are wired ports configured to mate with and electrically connect with respective electrical connectors of an electrical cable, and wherein the electrical cable and the electrical connectors provide the high-speed serial communications link.

16. The apparatus of claim 14, wherein the high-speed serial I/O ports of the docking station and of the portable device are wireless ports comprising respective wireless transceivers, and wherein the high-speed serial communications link is a wireless link that carries bits on one or more wireless electromagnetic carrier waves, and wherein the wireless transceiver of the docking station receives and decodes the bits transmitted wirelessly over the link before the bits are sent to the SerDes component of the docking station.

17. The apparatus of claim 14, wherein the high-speed serial I/O ports of the docking station and portable device are optical ports comprising respective optical transceivers, and wherein the high-speed serial communications link is an optical link that carries bits on optical signals, and wherein the optical transceiver of the docking station receives and decodes the bits transmitted as optical signals over the link before the bits are sent to the SerDes component of the docking station.

18. A method for communicating bits over a high-speed serial communications link between a portable device and a docking station, the method comprising:
   providing a docking station having at least a first serializer/deserializer (SerDes) component, one or more peripheral device input/output (I/O) ports and at least one high-speed serial I/O port;
   providing a portable device having at least a central processing unit (CPU) IC, one or more other ICs and at least one high-speed serial I/O port;
   providing the one or more ICs with a second serializer/deserializer (SerDes) component that converts parallel bits into a serial bit stream;
   providing a high-speed serial communications link between the high-speed serial I/O port of the portable device and the high-speed serial I/O port of the docking station;
   in the portable device, converting parallel bits destined for one or more peripheral devices connected to one or more of the peripheral device I/O ports of the docking station into a serial bit stream with the second SerDes component and outputting the serial bit stream via the high-speed serial I/O port of the portable device onto the high-speed serial communications link;
   inputting the serial bit stream communicated over the high-speed serial communications link to the docking station via the high-speed serial I/O port of the docking station;
   providing the serial bit stream to the first SerDes component of the docking station; and
   in the first SerDes component of the docking station, deserializing the serial bit stream and sending one or more of the deserialized bits to one or more of the peripheral devices connected to one or more of the peripheral device I/O ports of the docking station.

19. The method of claim 18, wherein the high-speed serial I/O ports of the portable device and of the docking station are wired ports configured to mate with and electrically connect with respective electrical connectors of an electrical cable, and wherein the electrical cable and the electrical connectors provide the high-speed serial communications link.

20. The method of claim 18, wherein the high-speed serial I/O ports of the docking station and of the portable device are wireless ports comprising respective wireless transceivers, and wherein the high-speed serial communications link is a wireless link that carries bits on one or more wireless electromagnetic carrier waves, and wherein the wireless transceiver of the docking station receives and decodes the bits transmitted wirelessly over the link before the bits are sent to the first SerDes component of the docking station.

21. The method of claim 18, wherein the high-speed serial I/O ports of the docking station and of the portable device are optical ports comprising respective optical transceivers, and wherein the high-speed serial communications link is an optical link that carries bits on optical signals, and wherein the optical transceiver of the docking station receives and decodes the bits transmitted as optical signals over the link before the bits are sent to the first SerDes component of the docking station.

* * * * *